April 19, 1960     K. B. BREDTSCHNEIDER ET AL     2,933,333
PIPE COUPLING

Filed Sept. 26, 1955                                    3 Sheets-Sheet 1

Inventors.
Kurt B. Bredtschneider,
Menke Drewes, Jr.,
Hubert C. Laird, &
Frank M. Onak.
By Joseph O. Lange
Atty.

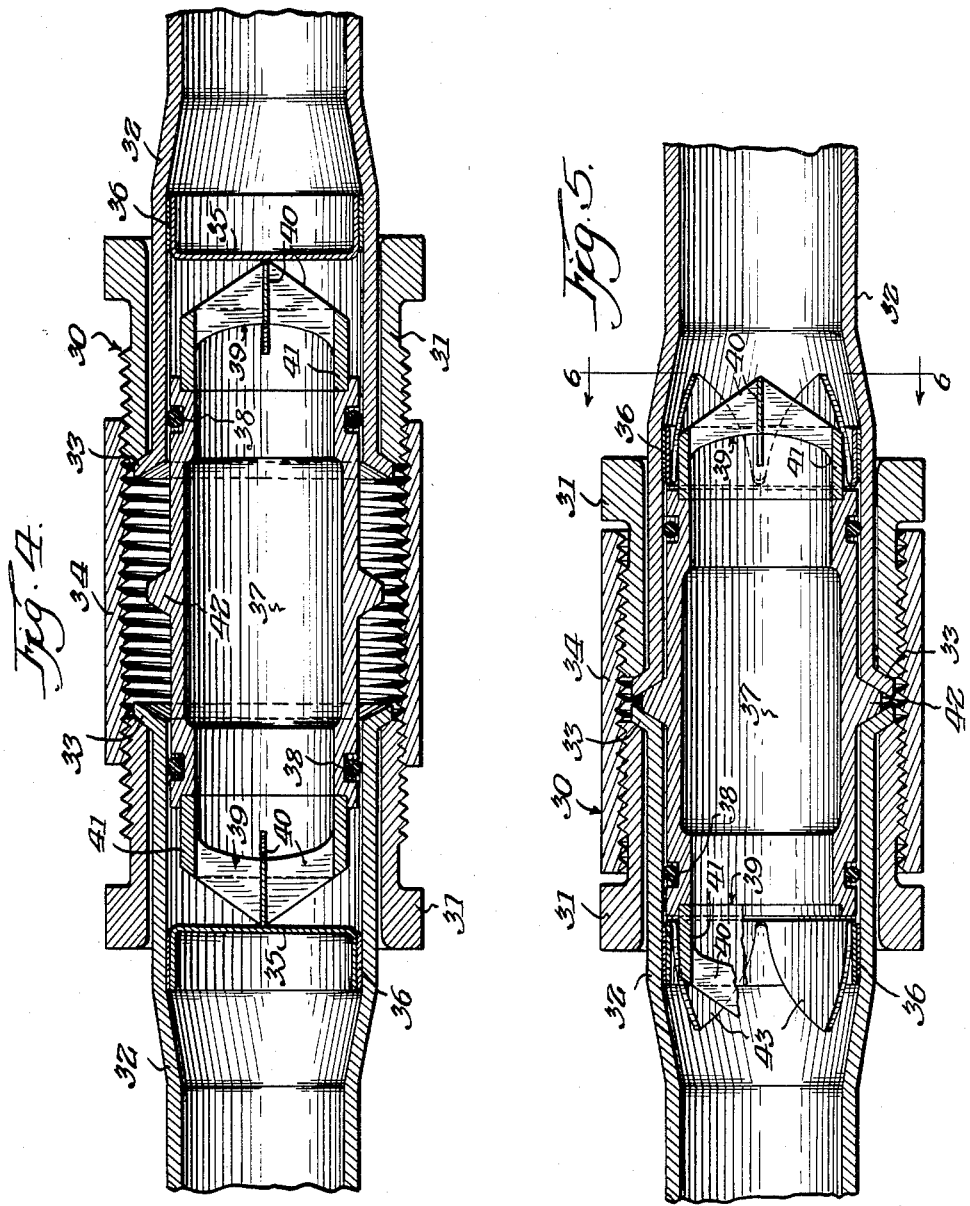

April 19, 1960 K. B. BREDTSCHNEIDER ET AL 2,933,333
PIPE COUPLING
Filed Sept. 26, 1955 3 Sheets-Sheet 3
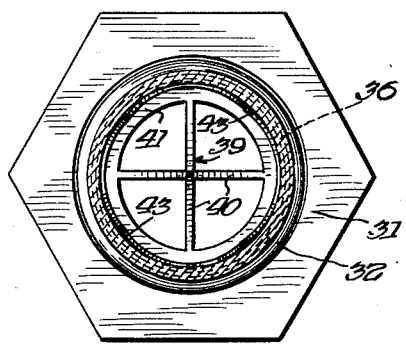
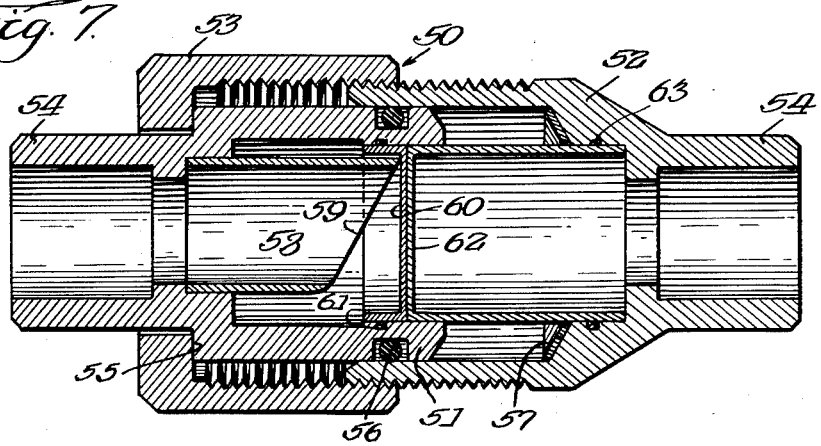
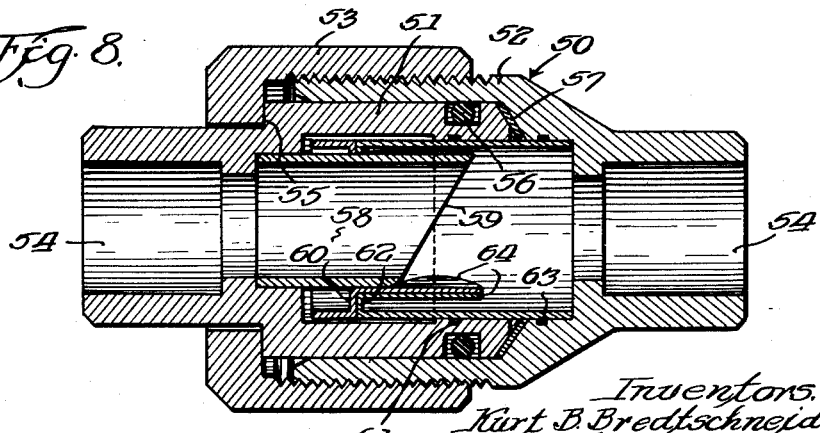
Inventors.
Kurt B. Bredtschneider,
Menke Drewes, Jr.
Hubert C. Laird, &
Frank M. Onak.
By Joseph O. Lang Atty.

United States Patent Office 2,933,333
Patented Apr. 19, 1960

2,933,333

PIPE COUPLING

Kurt B. Bredtschneider, Chicago, Menke Drewes, Jr., Evanston, Hubert C. Laird, Oak Park, and Frank M. Onak, Chicago, Ill., assignors to Crane Co., Chicago, Ill., a corporation of Illinois Application September 26, 1955, Serial No. 536,341

15 Claims. (Cl. 285—3)

The present invention relates to a coupling for parts of a closed pressure fluid system, and more particularly to such a coupling for connection of such parts containing fluid under pressure and closed at the portions to be secured together.

In closed systems containing fluid under pressure, for example in refrigerating or air conditioning applications, the connection or coupling of parts as in installation or repair presents a problem in cases where the parts are filled with the fluid prior to connection or assembly, the parts of course being suitably closed to hold the fluid under pressure. Such filling of the system or parts is practiced for convenience and economy. If the system is substantially self-contained with the parts closely associated and adapted to be handled and installed as a unit, it may readily be assembled with the parts in communication and filled with fluid under pressure. When remotely positioned parts are involved, however, they cannot well be so assembled prior to installation, while it is still highly desirable to supply the fluid therein beforehand. The parts, suitably closed, therefore, are filled with the fluid under pressure and connected when the system is installed. Ordinary couplings do not lend themselves to connection of the parts because they permit possibly dangerous escape of fluid, or allow entrapment of air in the fluid, or do not provide for placing the closed parts in communication. Couplings according to this invention permit such connections to be made even by inexperienced or untrained workers without danger, and provide for automatic placing of the parts in communication with each other without employment of valves or like expensive and complicated devices, without resulting in undesired admission of air to the system, and without escape of fluid therefrom. Such couplings may be basically of any common form modified to embody the invention, which as hereinafter disclosed in detail involves the provision of means closing the parts against escape of fluid and of disrupting means to break through the closing means upon coupling of the parts so that they are placed in communication.

It is an object of the invention to provide a coupling for closed fluid-containing parts of closed fluid-circulating systems which automatically places the parts in communication when coupled.

Another object is the provision of a coupling for closed fluid-containing parts of a pressure fluid system which automatically opens the parts for communication with each other when tightened in the coupling operation.

A further object of the invention is the provision of a coupling by which parts of a closed fluid-circulating system which contain fluid under pressure may be properly secured together and opened to each other by inexperienced workers without danger.

Another object is the provision of a coupling for sealed fluid-containing parts of a pressure fluid system by which the parts are automatically placed in communication when coupled without escape of fluid.

Another object is the provision of a coupling for sealed fluid-containing parts of a pressure fluid system by which the parts are automatically opened to each other when coupled without entrapment of air in the fluid.

Still another object is the provision of a coupling for parts of a closed pressure fluid system operating without valves to open the parts to each other upon coupling while preventing escape of the fluid or entrance of air into the system.

Other and further objects, advantages and features will be apparent to those skilled in the art from the following description taken in conjunction with the accompanying drawings in which:

Fig. 4 is an axial sectional view of another coupling embodying the invention, in assembled or engaged condition but not fully coupled;

Fig. 5 is a view similar to Fig. 4 showing the fully coupled condition of the coupling of Fig. 4;

Fig. 6 is a cross-sectional view taken substantially on the line 6—6 of Fig. 5;

Fig. 7 is an axial section of a further embodiment of the invention, showing the coupling in engaged but non-coupled condition; and Fig. 8 is a view similar to Fig. 7, but showing the fully coupled condition.

Figure 1:
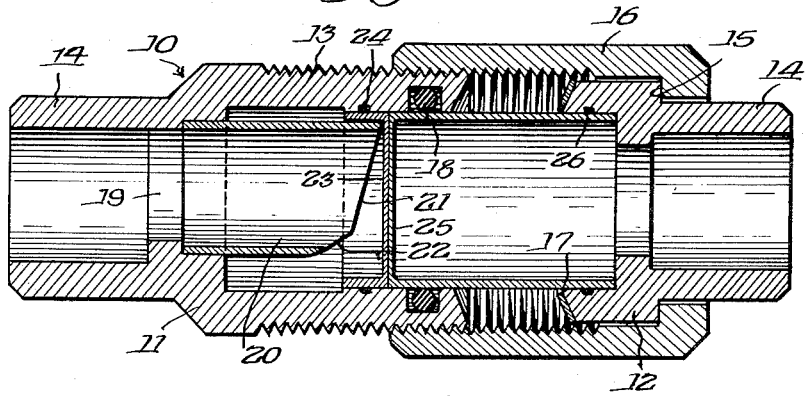
Fig. 1 is an axial sectional view through one form of coupling embodying the invention, showing the members in engaged but uncoupled relations.
Figure 2:
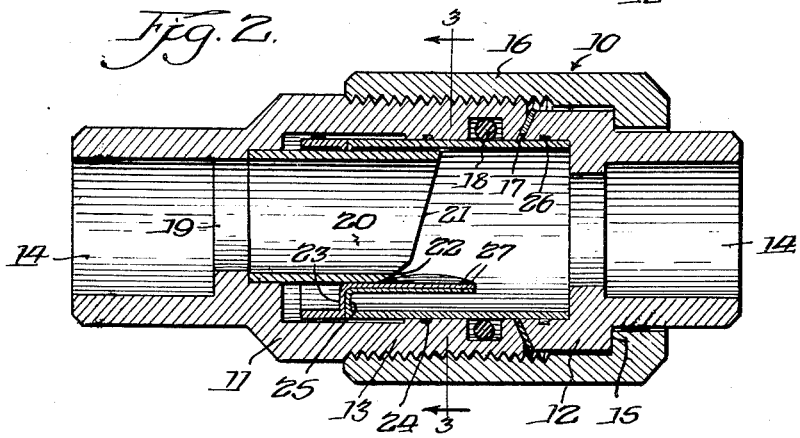
Fig. 2 is a view similar to Fig. 1, but showing the coupled condition.
Figure 3:
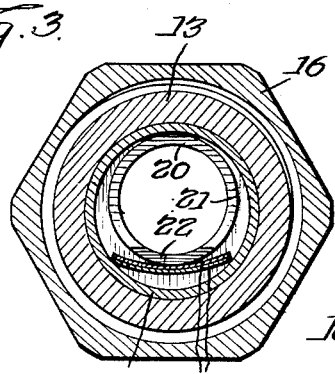
Fig. 3 is a cross-section taken substantially on the line 3—3 of Fig. 2.

Referring to the drawings, and particularly first to Figs. 1 to 3, there is shown one embodiment of the invention in the form of the coupling generally designated 10. A pair of generally cylindrical coupling parts 11 and 12 are provided, the part 12 being shorter than the part 11, which has an externally threaded body portion 13 of greater length than the body of the part 12. Each of the coupling parts has a reduced connecting portion 14 for connection to conduit means or other parts of a fluid system in a suitable manner. An external shoulder 15 is formed on the part 12 at the juncture of the body and connecting portion 14, this shoulder being engaged by an inturned flange portion of a hexagonal connecting nut or sleeve 16 which is internally threaded for connection to the externally threaded body portion 13 of the part 11. The ends of the body portions of the parts 11 and 12 are preferably of conical mating formation to abut when the coupling is drawn up, and a gasket 17 of any suitable material is provided to form a fluid-tight seal therebetween. The portion 13 has a groove in its inner face in which is disposed an O-ring 18 providing a temporary seal as hereinafter explained.

Each of the coupling parts has a fluid passage therethrough substantially coaxial with the part, except that the passage in the coupling part 11 has an eccentric portion 19 between the connecting portion and the body portion. An enlargement of this eccentric portion provides a seat in which is secured one end of a hollow cylindrical cutter 20 which extends longitudinally in the body portion, and has its opposite end formed at an angle, or obliquely to the cutter axis, to form a cutting edge 21. The obliquity of this end provides a point on the cutter at the portion thereof lying closest to the wall of the passage of the body portion 13. A portion 22 of this edge of the cutter diametrically opposite the pointed edge portion, or at the part farthest spaced from the wall of the passage, extends at a more acute angle than the cutting edge portion 21, and is rounded, as best shown in Fig. 3, to provide a blunt bending portion. Secured in the body portion 13 of the coupling part 11 outwardly of the cutter 20 is a thin metallic diaphragm 23 closing the passage, having sufficient strength to withstand the fluid pressure. For convenience of securement, the diaphragm has an integral flange lying against the passage wall and is secured thereto by a ring of solder 24 or the like which may be fractured upon application of sufficient pressure so that the securement of the diaphragm is separable. The diaphragm may be formed as a drawn cup, and is preferably mounted as shown, with the cutting end of the cutter 20 extending within the cup and close to the diaphragm proper. A similar diaphragm 25 is provided in the coupling part 12, and is also of cup-like form but of considerably greater depth than the diaphragm cup 23, the flange of the diaphragm engaging against an inner shoulder in the body portion of the part 12 and being secured by a ring of solder 26 or the like. The diaphragm 25 in the particular form shown thus projects from the body portion of part 12, and is received within the body portion 13 of part 11 when the parts 11 and 12 are initially connected by the sleeve 16 prior to being drawn together into closely coupled relation. The O-ring 18 provides a seal between the flange of the diaphragm 25 and the body portion 13. It will be clear that if desired both diaphragms 23 and 25 may be substantially identical, the part 12 in such case being formed with a sleeve portion for telescoping within the body portion 13 of part 11 and carrying the diaphragm 25.

It will be understood that the diaphragms 23 and 25 serve as closures for the ends of conduits or other parts of fluid systems in which fluid under pressure is contained, so as to prevent escape of the fluid. When the coupling 10 is employed to couple such parts of the system together, the sleeve 16 is rotated so that the parts 10 and 11 are drawn into tight abutting relation as is shown in Fig. 2. As the parts move relatively toward each other, the diaphragm 25 engages closely against the diaphragm 23, and continued relative movement of the parts causes the solder 24 to give way, so that the diaphragm 23 may move within the part 11 with the diaphragm 25. The relative movement of the parts 11 and 12 toward each other results in the cutter 20 penetrating or breaking through both the closely engaged diaphragms, cutting generally arcuate flaps 27 therefrom which are bent by the blunt bending portion 22 radially outwardly toward the space adjacent the passage wall provided by the eccentricity of the cutter, then overridden by the cutter and bent to a final position in that space. The coupling parts 11 and 12 are thus opened to each other, and the flaps disposed out of the path of fluid which is now free to flow between the parts, the cutter 20 defining a part of the passage. The O-ring 18 seals against any escape of fluid during the period between the first penetration of the diaphragms and the seating of parts against each other, and with the gasket 17 provides double sealing when the parts are fully coupled. The engagement of the diaphragms 23 and 25 against each other eliminates any air space therebetween, so that air, which might form bubbles interfering with the flow or otherwise prove deleterious in the system, cannot enter the fluid stream in the coupling operation.

Another form which the invention may take is shown in Figs. 4 to 6, in which the coupling is generally designated 30. This coupling comprises a pair of identical generally cylindrical parts 31, arranged in abutting relation, each receiving an enlarged end portion of a tube 32, which in this case is of copper but may be of other material, the end of which is flared as at 33 and engaged by the inner end of the associated part 31. The parts 31 have externally threaded portions which are received within a hexagonal connecting sleeve or nut 34 so that they may be drawn together in abutting relation by rotation of the nut. Within each coupling part 31 there is disposed a thin metallic diaphragm 35 which, as shown, takes the form of a cup, and is secured by brazing 36 or the like within the enlarged end portion of the tubing.

Telescopingly received in the parts 31 is a hollow cylindrical member 37 with grooves in its external surface adjacent the ends thereof receiving O-rings 38 sealingly engaging the inner walls of the tubes 32. The tubular member 37 extends between the diaphragms 25 and has at each end a star-type cutter 39 comprising a plurality of pointed cutting blades 40 extending from a ring 41 secured in any suitable manner on the end of the member 37. The cutters, of course, are of open spider formation allowing flow therethrough. The tubular member 37 preferably has a circumferential boss 42 substantially at its center of suitable form to engage sealingly with the flared portions 33 of the tubing when the coupling parts are drawn together, the flared ends serving as gaskets. Of course, the abutment or boss 42 might be omitted and the parts 31 formed to abut directly against each other.

The threaded members are rotated so that first one and then the other of the parts 31 are threaded into the nut 34. The parts 31 thus approach each other and the diaphragms move against the cutters 39 and are disrupted by the blades 40, as will be evident from Figs. 5 and 6. As the cutters pass through the diaphragms, the disrupted portions 43 are forced radially outwardly and bent by the rings 41 so as not to block the flow through the passage. The tubular member 37 serves as a part of the passage through the coupling, extending within and connecting the tubes 32. As in the case of the coupling 10, the O-rings 38 provide temporary seals upon disruption of the diaphragms as the cutters penetrate therethrough, before the seals between the abutment or boss 42 and the flared tube portions 33 are effected, and afford a double seal therewith upon coupling of the parts.

It will be apparent that although copper tubing is employed in the instant case, in effect forming a part of each coupling part 31, tubing of other material may be employed if desired, and suitable gasket means provided to form a permanent seal. It will further be obvious that the tubing 32 may be omitted and the coupling parts 31 may be formed similarly to the part 11 disclosed in Fig. 1, with connecting portions at their outer ends for connection to conduit of any desired type. The tubular member 37 then will engage directly against the inner surfaces of the parts 31. In such case, right and left-hand threads are employed on the opposite ends of the nut 34.

Another coupling, generally designated 50, embodying the present invention is shown in Figs. 7 and 8. In this coupling, a pair of passaged coupling parts 51 and 52 are provided, the part 51 telescoping within the part 52, and the latter having an externally threaded body portion engaging an internally threaded hexagonal nut or sleeve 53. Each of the parts 51 and 52 has a reduced connecting portion 54, the sleeve 53 having an inturned flange engaging a shoulder 55 between the connecting end body portions of the part 51, so that rotation of the sleeve will draw the parts relatively toward each other. A groove in the external face of the part 51 mounts an O-ring 56 engaging against the inner wall of the part 52 to provide a temporary seal. A gasket 57 may be provided between a seat in the part 52 and the mating end of the part 51. The remainder of the construction is generally similar to that of the coupling 10. A generally cylindrical hollow cutter 58 is secured at one end against a shoulder formed between the connecting and body portions of the part 51 eccentrically of the passage and extends longitudinally within the body portion. The other end of the cutter, adjacent the mouth of part 51, is formed at an angle to the axis of the cutter to provide a cutting edge portion 59, defining a point on the cutter at the portion closest the passage wall, and having the portion opposite the point rounded or otherwise blunted so as not to cut. A diaphragm 60 of thin metallic material is secured across the passage in the part 51 adjacent the cutting end of the cutter 58 and secured as by solder 61. In the part 52, another thin metallic diaphragm 62 is provided which may have a relatively deep cylindrical flange extending from adjacent the juncture of the connecting and body portions of the part and secured as by solder 63. The flange or cup portion of the diaphragm is received telescopingly in the part 51 and engages the diaphragm 60 as the parts are drawn together by rotation of the sleeve 53.

It will be apparent that as the coupling parts are moved relatively toward each other by the sleeve, the separable connection provided by the solder 61 is broken and the diaphragms pierced and cut by the cutter 58 substantially as in the case of the coupling 10. As is evident from Fig. 8, arcuate flaps 64 are cut from the diaphragms and bent radially outwardly by the blunted portion of the cutting edge 59 out of the path of fluid which may now flow through the parts. The portion of the cutter spaced the farthest from the passage wall overrides these flaps 64 to hold them clear of the fluid path, as in the coupling 10.

It will be clear that although only three embodiments of the invention are illustrated herein, the invention is susceptible of many other forms and accordingly it is not intended that the invention be limited to the specific illustrative embodiments disclosed.

We claim:

1. A coupling for a closed fluid system, comprising a pair of coupling parts movable relatively toward each other each having a passage therethrough, means for moving said parts toward each other in passage-aligning relation, a relatively thin metallic diaphragm in each part closing the passage therein, passaged cutting means disposed interiorly of the parts disrupting said diaphragms upon movement of the parts toward each other to open the passages to each other and defining a portion of the passage through the coupled parts, means sealing against leakage during movement of the parts to final position after diaphragm disruption, and gasket means sealing between the parts in final position thereof.

2. A coupling for a closed fluid-circulating system, comprising a pair of passaged coupling parts movable relatively towards each other in passage-aligning relation, means connecting said parts in said relation, a diaphragm within each of said parts closing the passage therein, disrupting means extending within at least one of said parts engaging and disrupting said diaphragms upon movement of the parts toward each other to place said parts in communication, means sealing against leakage during movement of the parts to final position after diaphragm disruption, and gasket means sealing between the parts in final position thereof.

3. A coupling for a closed fluid-circulating system, comprising a pair of cooperating passaged coupling parts movable toward and from each other in passage-aligning relation, means connecting said parts in said relation, disruptable means in each of said parts closing the passage therein, means of open formation disposed interiorly of said parts engaging and disrupting said disruptable means upon movement of said parts toward each other to place said parts in communication, means sealing against leakage during movement of the parts to final position after disruption of the disruptable means, and gasket means sealing between the parts in final position thereof.

4. A coupling for a closed fluid system, comprising a pair of coupling parts each having a passage therethrough movable toward each other, means for moving said parts toward each other in passage-aligning relation, a thin metallic diaphragm in each part closing the passage therethrough, cutting means disposed interiorly of the parts disrupting said diaphragms upon movement of the parts toward each other to place said passages in communication, said cutting means including displacing means bending the disrupted diaphragms radially of the passages, means sealing against leakage during movement of the parts to final position after diaphragm disruption, and gasket means sealing between the parts in final position thereof.

5. A coupling for a closed fluid-circulating system, comprising a pair of passaged coupling parts relatively movable toward each other, means for moving the parts relatively toward each other in passage-aligning relation, a thin metallic diaphragm in each part closing the passage therein, said diaphragms engaging upon said movement of the parts and the diaphragm in one of the parts having separable securement therein for detachment therefrom and movement therein by the other diaphragm, and a tubular member secured in said one part inwardly of the diaphragm extending toward the other part having its end adjacent said other part extending obliquely to the longitudinal axis of the member and forming a cutting portion on the member penetrating said engaged diaphragms upon said movement thereof to place said passages in communication.

6. A coupling for a closed fluid-circulating system, comprising a pair of passaged coupling parts relatively movable toward each other, means for moving the parts toward each other in passage-aligning relation, means in each part closing the passage therein, said closing means engaging against each other upon said movement of the parts and the closing means in one of said parts having separable securement therein for detachment therefrom and movement therein by the other closing means, and a piercing member secured in said one part inwardly of and adjacent the closing means engaging and penetrating said closing means upon said movement thereof to open the passages to each other.

7. A coupling for a closed fluid-circulating system, comprising a pair of passaged coupling parts relatively movable toward each other, means for moving the parts toward each other in passage-aligning relation, a relatively thin metallic diaphragm in each part closing the passage therein and engaging the diaphragm in the other part upon movement of the parts toward each other, the diaphragm in one of said parts having separable securement in the passage for detachment therefrom and movement therein by the diaphragm of the other part, and a tubular member secured in said one part inwardly of the diaphragm thereof defining a portion of the passage disposed eccentrically of the remainder of the passage and extending toward the other part having its end adjacent said other part extending obliquely to its axis, said member cutting through said diaphragms upon movement of the parts toward each other and displacing the cut portions of the diaphragms radially outward of the member into the space provided by the eccentricity thereof.

8. A coupling for a closed fluid-circulating system, comprising a pair of passaged coupling parts relatively movable toward each other, means for moving said parts toward each other in passage-aligning relation, a relatively thin metallic diaphragm in each part closing the passage therein, said diaphragms engaging upon movement of the parts toward each other and the diaphragm in one of said parts having separable securement therein for detachment therefrom and movement therein by the other diaphragm, and a tubular member secured in said one part inwardly of the diaphragm extending toward the other part defining a portion of the passage disposed eccentrically of the remainder of the passage having its end adjacent the other part extending non-normal to the axis of the member to form a penetrating portion thereon cutting through said diaphragms upon said movement of the parts to open the passages to each other, said tubular member having a portion adjacent said non-normal end bearing on the cut portions of said diaphragms during said movement to displace the cut portions radially.

9. A coupling for a closed fluid-circulating system, comprising a pair of passaged coupling parts relatively movable toward each other, means for moving said parts relatively toward each other in passage-aligning relation, means in each part closing the passage therein, said closing means engaging against each other upon said movement of the parts and the closing means of one of the parts having separable securement therein for detachment and movement by the other closing means, and piercing means secured in said one part adjacent and inwardly of the closing means thereof engaging and penetrating said engaged closing means upon said movement thereof to open the passages to each other, said piercing means including means bearing against and displacing the penetrated closing means toward the wall of the passages to prevent flow obstruction thereby.

10. A coupling for a closed fluid-circulating system comprising a pair of passaged coupling parts relatively movable toward each other, means for moving said parts relatively toward each other in abutting relation, a thin metallic diaphragm in each part closing the passage therein, said diaphragms engaging upon said movement of the parts and the diaphragm in one part having separable securement for detachment therefrom and movement therein by the other diaphragm and said other diaphragm telescoping within said one part, a tubular member secured in said one part inwardly of the diaphragm disposed eccentrically of the passage providing a space adjacent a passage wall and radially outward relative to the member, said member defining a portion of the passage and having an obliquely formed end adjacent the diaphragm including a bending portion adjacent said space and a cutting portion, said cutting and bending portions upon said movement of the engaged diaphragms respectively disrupting the diaphragms and displacing portions of the disrupted diaphragms into said space to place said parts in communication, and sealing means between said other diaphragm and said one part.

11. A coupling for a closed fluid-circulating system, comprising connecting means, a pair of abuttable passaged coupling parts engaged with said connecting means relatively movable toward each other, said connecting means being operable to move said parts toward each other in passage-aligning relation, a disruptable member secured in each part closing the passage therein, said disruptable members engaging upon said movement of the parts and one of the members having separable securement for detachment from and movement in its associated part by the other member in said movement, and a member having a cutting edge with a bending portion and mounted adjacent said one diaphragm engaging and cutting through said engaged disruptable members upon said movement thereof to place said parts in communication, said bending portion displacing portions of the disrupted members radially outwardly of the passage axis.

12. A coupling for closed fluid pressure systems, comprising a pair of substantially abuttable passaged coupling parts relatively movable toward each other, means connecting said parts operable to move the parts relatively toward each other in passage-aligning relation, penetrable means in each part closing the passage therein, said penetrable means having portions engaging each other upon said movement of the parts and the penetrable means in one of the parts having separable securement for detachment therefrom and movement therein by the other penetrable means, and penetrating means secured in said one part inwardly of the penetrable means eccentrically of the passage penetrating said engaged penetrable means upon said movement thereof and displacing portions thereof generally radially outwardly toward the area of greatest spacing between said penetrating means and a passage wall to place the passages in communication, said penetrating means having open construction allowing flow therethrough.

13. A coupling for a closed fluid-circulating system, comprising a pair of passaged coupling parts movable relatively toward each other in telescoping relation, connecting means engaging said parts for moving the parts relatively toward each other in passage-aligning relation, sealing means between overlapping portions of the parts, a thin metallic diaphragm in each part closing the passage therein, said diaphragms engaging upon said movement of the parts and the diaphragm in one of the parts having separable securement therein for detachment therefrom and movement therein by the other diaphragm, and a tubular member secured in said one part inwardly of the diaphragm disposed eccentrically of the passage providing a space adjacent a passage wall and radially outward relative to the member and having an obliquely formed cutting end adjacent the diaphragm, said member defining a portion of the passage and disrupting the engaged diaphragms upon said movement thereof to place the passages in communication and overriding the disrupted diaphragms to displace portions thereof into said space.

14. A coupling for closed fluid-circulating systems, comprising a pair of telescoping passaged coupling parts relatively movable toward each other, connecting means engaging said parts operable to move the parts relatively toward each other in telescoped passage-aligning relation, a disruptable member secured in each part closing the passage therein, said disruptable members engaging upon said movement of the parts and the member in one of the parts having separable securement for detachment therefrom and movement therein by the other member, and a disrupting member having a cutting edge mounted with said edge adjacent the disruptable member, said disrupting member cutting through said engaged disruptable members upon said movement thereof to place the passages in communication and overriding portions of the disrupted members to displace the same radially outwardly of the passage axis.

15. A coupling for closed pressure fluid systems, comprising a pair of telescoping coupling parts relatively movable toward each other, means connecting said parts operable to move the parts relatively toward each other in passage-aligning relation, penetrable means in each part closing the passage therein, said penetrable means having portions engaging each other upon said movement of the parts and the penetrable means in one of said parts having separable securement for detachment therefrom and movement therein by the other penetrable means, and penetrating means in said one part displacing said engaged penetrable means out of closing relation in the passages to place the passages in communication, said penetrating means having open construction allowing flow therethrough.

References Cited in the file of this patent

UNITED STATES PATENTS

| | | |
|---|---|---|
| 1,664,796 | Spangle | Apr. 3, 1928 |
| 1,933,117 | Markle | Oct. 31, 1933 |
| 2,059,629 | Erwin | Nov. 3, 1936 |
| 2,507,379 | Morrison | May 9, 1950 |
| 2,667,760 | Curtis | Feb. 2, 1954 |
| 2,759,743 | Bloom | Aug. 21, 1956 |

FOREIGN PATENTS

| | | |
|---|---|---|
| 4,075 | Great Britain | Mar. 15, 1915 |
| 693,636 | Great Britain | July 1, 1953 |